Nov. 27, 1956  D. S. HALL  2,772,122
PEBBLE HEAT EXCHANGER
Filed July 28, 1952  2 Sheets-Sheet 1

INVENTOR.
D. S. HALL
BY Hudson and Young
ATTORNEYS

INVENTOR.
D. S. HALL

# United States Patent Office 2,772,122
Patented Nov. 27, 1956

2,772,122

PEBBLE HEAT EXCHANGER

Dick S. Hall, Bartlesville, Okla., assignor to Phillips Petroleum Company, a corporation of Delaware Application July 28, 1952, Serial No. 301,408

8 Claims. (Cl. 302—53)

This invention relates to pebble heat exchangers. In one of its more specific aspects, it relates to pebble heat exchanger apparatus. In another of its more specific aspects, it relates to an improved means for controlling the movement of pebbles through a pebble heat exchanger. In another of its more specific aspects, it relates to a means for feeding pebbles into a gas lift-type elevator. In another of its more specific aspects, it relates to a method for entraining pebbles in a gas lift type elevator.

Heat exchangers of the so-called "pebble heater" type have been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce variable products such as ethylene and acetylene, as well as for other reactions and purposes. Conventional pebble heater type apparatus includes two refractory lined contacting chambers disposed one above the other and connected by a refractory lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between ¼ inch to ⅜ inch are preferred. The pebbles must be formed of a refractory material which will stand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well at high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 50° F. to 200° F. below the highest temperature of the pebbles within the first chamber. In processes for the production of ethylene from light hydrocarbons, such as ethane, propane, or butane, the pebble temperature in the reaction chamber is usually in the range of 1200° F. to 1800° F. For the production of acetylene by pyrolysis of hydrocarbons, temperatures in the range of 1600° F. to 3000° F. are desirable.

In the past, considerable trouble has been encountered in removing a uniform feed of pebbles from the lower end portion of a pebble heat exchanger. Conventional feeding mechanisms which have been used for providing controlled flow of pebbles from the lower end portion of pebble heat exchangers include star valves, gate valves, vibratory feeders and rotatable table feeders. These conventional feeders have normally been positioned within the conduit extending between the lower end portion of the lowermost pebble heat exchange chamber and the pebble elevator. These pebble feeders were initially used in connection with mechanical pebble elevators. More recent practice in pebble heat exchangers has been to utilize a gas lift for the purpose of elevating pebbles to the uppermost pebble heat exchange chamber. Trouble has been encountered, when using the conventional feeders, in obtaining uniform flow and entrainment of the pebbles without subjecting these pebbles to considerable mechanical shock during the initial entrainment thereof. It has also been difficult to obtain different closely controllable rates of pebble flow in the gas lift-type elevator. I have devised a means whereby a closer control of pebble flow is obtained with a smaller amount of mechanical shock to the pebbles. Control of pebble flow in this manner, unexpectedly reduces abrasion of the conduit extending between the reaction chamber and the gas lift. It also makes it possible to obtain a very close control and variation of the pebble flow in a gas lift type elevator.

Each of the following objects of the invention is attained by at least one aspect of this invention.

An object of this invention is to provide improved pebble heat exchange apparatus. Another object of the invention is to provide improved pebble feeding means. Another object of the invention is to provide means for controlling the volume flow of pebbles to a pebble elevator. Another object of the invention is to provide means for entraining pebbles in a gas lift-type elevator with a minimum of mechanical shock to the pebbles. Another object of the invention is to provide an improved means for entraining pebbles at a controlled flow rate in a gas lift-type elevator. Other and further objects and advantages will be apparent to those skilled in the art upon study of the accompanying discussion and the drawings.

Broadly speaking, this invention comprises a means and method for controlling the rate of flow of solid particles such as pebbles into an air lift. A chamber is provided around at least a portion of the lower end of the gas lift conduit and extends nearly to the lower end of the air lift conduit. A group of conduits extend into the lower end of the air lift chamber, and are positioned immediately below the air lift conduit. The flow of secondary gas may be adjusted so as to flow at different rates, against specific portions of pebbles. It is preferred that the conduits be concentric. The flow of primary gas through the annular space between the outside of the gas lift conduit and the shell which surrounds at least a portion of the gas lift conduit may be regulated as well as the central conduit. When no pebbles are to be circulated, the valves in the conduits to the individual concentric conduits are closed, and only primary lift gas (normally a constant amount) passes through the air lift conduit. The conduit to the upper end portion of the chamber surrounding the gas lift conduit is designated as the primary gas conduit. Conduits to the annular gas lift conduits are designated as secondary gas conduits. When pebble circulation is desired, one or more of the secondary gas conduit valves is opened and pebbles are blown up into the primary gas stream and up the air lift conduit. Gas flowing through only the center pipe of the secondary gas conduits gives the smallest pebble flow rate. Flow of gas through successive concentric rings increases the pebble circulation rate. Any number of additional concentric conduits can be provided so as to give better control of the pebble flow rate.

Better understanding of this invention will be obtained upon study of the accompanying schematic drawings in which.

Figures 1, 3:
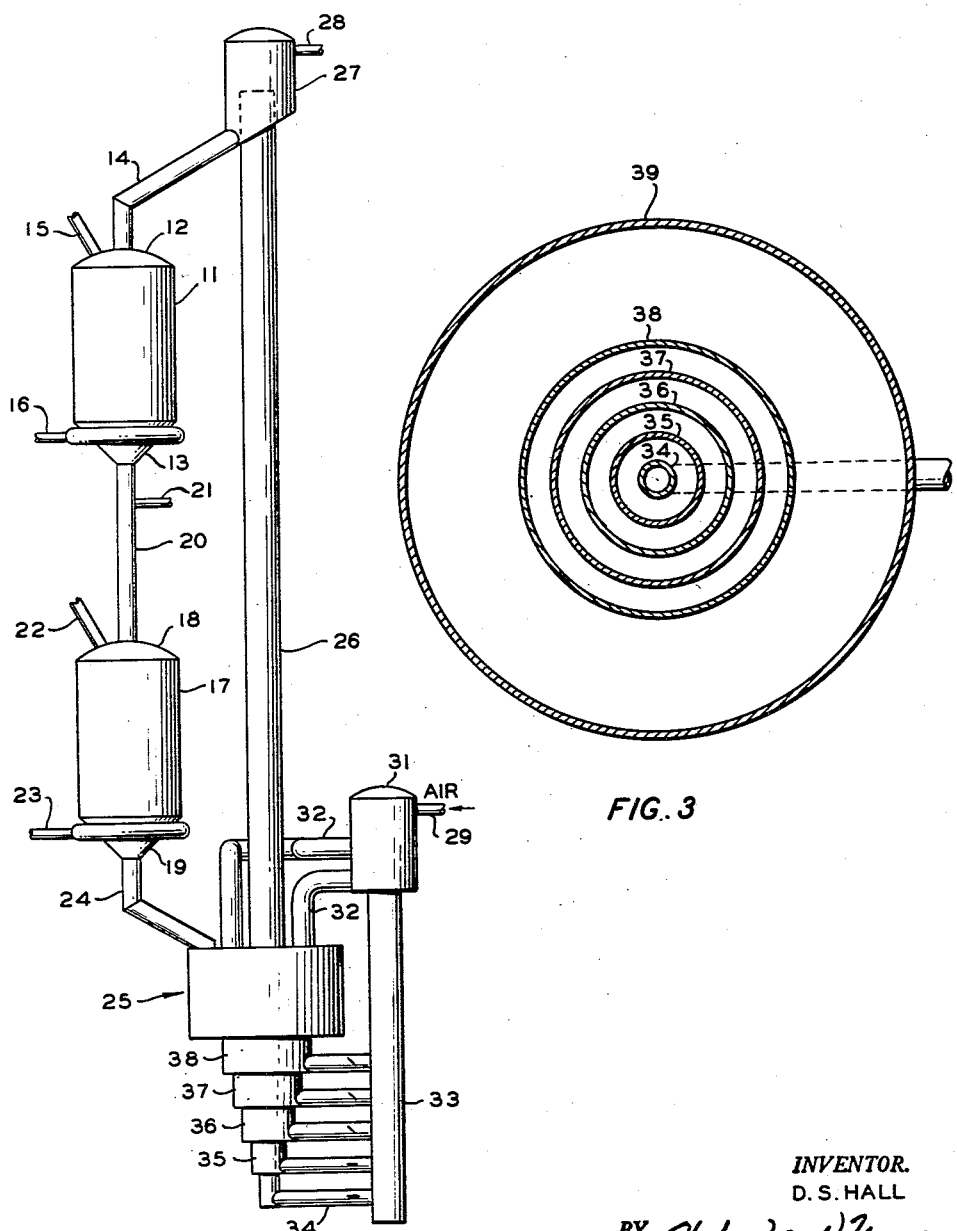
Figure 1 is a diagrammatic representation of a pebble heat exchanger system.
Figure 3 is a sectional view of the pebble feeding device taken along the line 3—3 of Figure 1.

Referring particularly to Figure 1 of the drawings, upright elongated shell 11 is closed at its upper and lower ends by closure members 12 and 13, respectively. Pebble inlet means 14 may be a single conduit, as shown, or may be a plurality of pebble conduits connected to the upper end portion of shell 11 at separated points. Gaseous effluent conduit 15 is provided in the upper end portion of the shell 11, preferably extending from closure member 12. Gaseous material inlet conduit 16 is connected to the lower end portion of shell 11, preferably by means of a header member through closure member 13.

Upright elongated shell 17, closed at its upper and lower ends by closure members 18 and 19, respectively, is disposed below shell 11. The upper end portion of shell 17 is connected to the lower end portion of shell 11 by pebble conduit means such as conduit 20 or by a plurality of such conduits. An inert gas inlet conduit 21 is connected to conduit 20 intermediate its ends. Gaseous effluent conduit 22 extends from the upper end portion of shell 17 and gaseous material inlet conduit 23 is connected to the lower end portion of shell 17, preferably by means of a header member through closure member 19. Pebble outlet conduit 24 extends downwardly from the lower end portion of shell 17 and is connected at its lower end portion to pebble feeder assembly 25. Pebble feeder assembly 25 surrounds a lower end portion of elevator conduit 26 and communicates with the elevator through the lower end of the elevator conduit. Gas-pebble separator chamber 27 encompasses the upper end portion of elevator conduit 26 and is connected at its lower end portion to the upper end portion of pebble inlet conduit 14. Gaseous material outlet conduit 28 extends from the upper end portion of the gas pebble separator chamber 27. Lift gas inlet conduit 29 extends into lift gas distribution chamber 31. Lift gas chamber 31 is connected to the upper end portion of pebble feeder assembly 25 by means of primary gas conduits 32. Secondary gas conduit 33 is connected to a plurality of supplemental secondary gas conduits 34, 35, 36, 37 and 38. Conduit 34 extends into a central portion of the pebble feeder assembly and conduits 35, 36, 37 and 38 terminate in annular secondary gas conduits of the pebble feeder assembly 25. Pebble feeder assembly 25 is preferably positioned so that the outlet end of conduit 34 is located coaxially with respect to elevator conduit 26.

Figure 2:
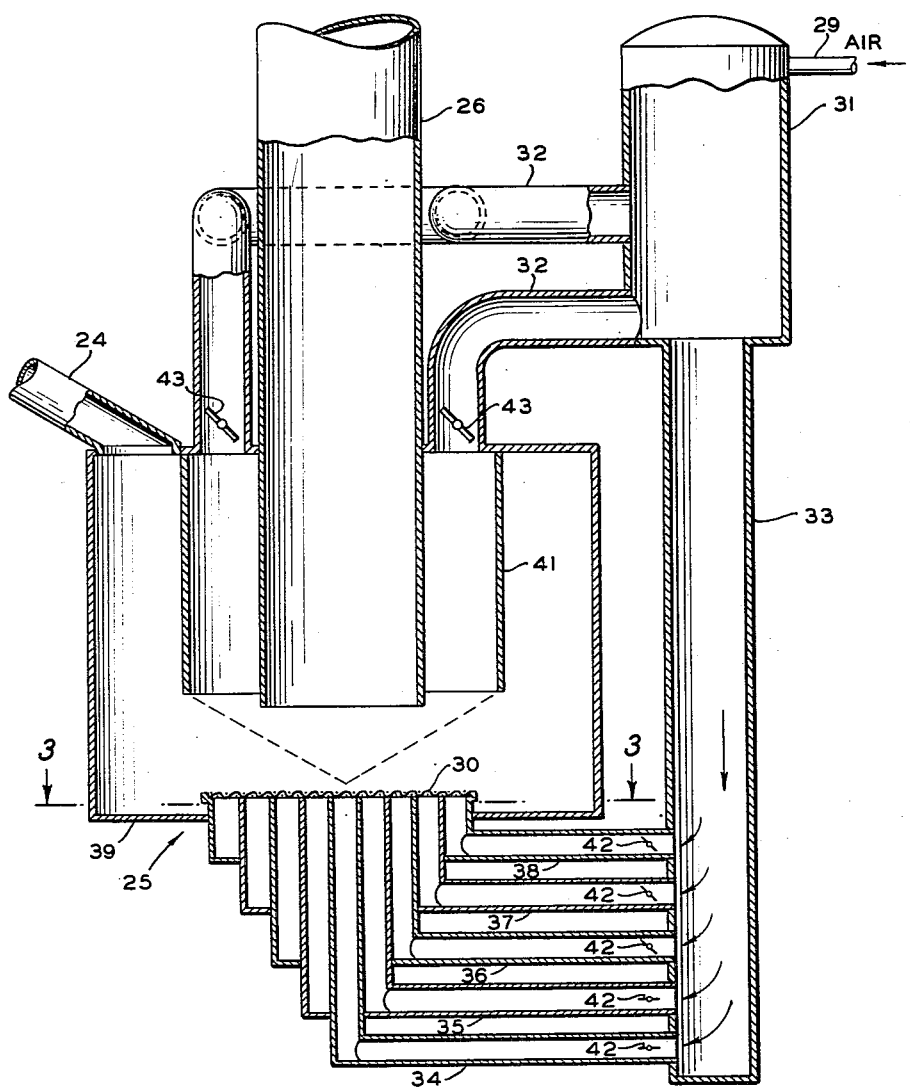
Figure 2 is a preferred form of the pebble feeding device of this invention.

Specific details of pebble feeder assembly 25 are shown in Figures 2 and 3 discussed hereinafter. Referring to Figure 2, pebble feeder assembly 25 comprises an outer shell 39 which is connected at its upper end portion to pebble conduit 24. Inner shell 41 and elevator conduit 26 provide a passageway therebetween for primary gas from conduits 32 into the lower portion of pebble feeder assembly 25. The inner shell 41 is open at its lower end so as to permit the flow of primary gas through pebble feeder assembly 25 into the lower end portion of elevator conduit 26. Valves 42 are provided in secondary gas conduits 34, 35, 36, 37 and 38 so as to regulate the flow of gas through each of those conduits. Valves 43 are provided in primary gas conduits 32 so as to control the flow of primary gas at a constant amount. Secondary gas conduit 34 is axially positioned with respect to pebble elevator conduit 26. Secondary conduit 35 terminates as an annular conduit disposed about conduit 34. Conduits 36, 37 and 38 are successively larger in diameter and form additional annular chambers about a conduit of smaller cross-section. The specific arrangement of these conduits will be more apparent upon reference to Figure 3 of the drawings.

In the operation of the device shown in Figure 1 of the drawings, pebbles are introduced into the upper end portion of chamber 11 through pebble inlet conduit 14. Gaseous heating material is introduced into the lower end portion of chamber 11 through inlet conduit 16 and passes upwardly in direct heat exchange with the contiguous gravitating mass of pebbles therein. The gaseous heating material which is introduced through conduit 16 may be in the form of hot combustion gases or may be in the form of fuel and air which latter materials are burned in chamber 11. The pebbles are heated in this direct heat exchange with the gaseous heat exchange material to a temperature generally in the range of between 1400° F. and 3200° F. Gaseous effluent is removed from the upper end portion of chamber 11 through gaseous effluent conduit 15. The heated pebbles are gravitated through conduit 20 into chamber 17 as a contiguous gravitating mass. Gaseous material to be heated or converted within the chamber 17 is introduced into the lower portion of that chamber through inlet conduit 23. This gaseous material passes upwardly through the gravitating mass of heated pebbles and is raised to the desired temperature in direct heat exchange with the pebbles. In processes in which the gaseous material is converted, the resulting reaction products are withdrawn from the upper end portion of chamber 17 through gaseous effluent conduit 22. Where the process utilizes chamber 17 only as a preheating chamber, the heated gases are removed as effluent from chamber 17 through gaseous effluent conduit 22.

Pebbles are gravitated from the lower end portion of chamber 17 through conduit 24 and into the annular chamber formed between outer shell 39 and inner shell 41 of pebble feeder assembly 25. The pebbles flow downwardly in pebble feeder assembly 25 and assume a normal angle of repose, the upper surface of the pebble bed extending inwardly and downwardly from the lower edge of shell 41 to the upper end of conduit 34. Screen 39 prevents the pebbles from falling into the secondary gas conduits.

A predetermined amount of gas is introduced into pebble feeder assembly 25 through primary gas conduits 32. Passage of the primary gas through the pebble feeder assembly and through pebble elevator conduit 26 will not entrain pebbles introduced in the pebble feeder assembly 25. When a very small amount of pebble flow is desired through the pebble heater apparatus valve 42 in secondary gas conduit 34 is opened so as to permit a controlled amount of lift gas to flow through that conduit into pebble feeder assembly 25. This stream of gas lifts a portion of the pebbles into the major stream of primary lift gas and the combined streams of gas carry the pebbles upwardly through pebble elevator conduit 26. When larger amounts of pebbles are desired, the valves in conduits 35, 36, etc., may be opened so as to lift additional amounts of pebbles into the primary gas stream. The pebbles which are carried upwardly through elevator conduit 26 are separated from the lift gas in the pebble separator chamber 27. The lift gas is removed from chamber 27 through effluent conduit 28. Pebbles which are separated from the lift gas gravitate through pebble conduit 14 into the upper end portion of chamber 11 wherein the pebbles are once again heated for return to chamber 17.

A gas such as steam is ordinarily introduced into the conduit 20 between chambers 11 and 17 so as to prevent the flow of combustion products downwardly through conduit 20 to chamber 17 or to prevent the flow of reaction products upwardly through conduit 20 into chamber 11, depending upon the pressure balance of the two chambers.

It should be readily apparent that very close control of the pebble flow through the pebble heater system is obtainable with the device of this invention. One modification of this invention which can be utilized is to group non-annular secondary lift gas conduits as a bundle which can be positioned below the elevator conduit. The annular type arrangement is preferred.

Various modifications of this invention will be apparent to those skilled in the art upon study of the accompanying disclosure. Such modifications are believed to be clearly within the skill of the art and thus within the spirit and the scope of this disclosure.

I claim:

1. A pebble feeder comprising in combination a first upright cylindrical shell having top and bottom closure members; a second cylindrical shell coaxial with said first shell fixed to said top closure member and forming an annulus between the two shells, said second shell extending into the lower section of the chamber formed by said first shell; a pebble inlet conduit connecting with the upper section of aforesaid annulus; an elevator conduit coaxial with said shells extending upwardly from a level adjacent the lower end of said second shell thru said top closure member and forming a second annulus with said second shell; at least one primary gas supply conduit connected with said second annular space; several secondary gas supply conduits coaxial with said shells and leading upwardly thru said bottom closure member to a level below said elevator conduit to provide a cylindrical and a plurality of annular gas pasasges directed toward the lower end of said elevator conduit, said conduits extending outwardly beyond said elevator conduit, the structure thus far defined providing at least a layer of pebbles over each of said secondary gas supply conduits when a stream of pebbles is fed to said feeder thru said pebble inlet conduit; and means for supplying a lifting gas to each of said gas supply conduits.

2. Apparatus comprising in combination the pebble feeder of claim 1; a first pebble heat-exchange chamber connected by conduit means with a second subjacent pebble heat-exchange chamber; means for passing gases thru each of the chambers; a pebble inlet conduit connected with the upper end of said first chamber; a pebble outlet conduit leading from the lower section of said second chamber to the pebble inlet conduit of said feeder, said elevator conduit extending to a level above said first chamber; a pebble-gas separation chamber connected with the upper end of said elevator conduit; and an outlet from said separation chamber connected with the pebble inlet conduit leading to said first pebble heat-exchange chamber.

3. The pebble feeder of claim 1 wherein a screen is affixed to the outlet ends of said secondary gas supply conduits.

4. The apparatus of claim 1 including separate inlet conduits leading to each of said secondary gas supply conduits having valve means therein for separately regulating the supply of gas to said secondary gas supply conduits.

5. The apparatus of claim 1 wherein the elevator conduit terminates at a level just below the lower end of said second shell.

6. The apparatus of claim 5 wherein the upper ends of said secondary gas supply conduits terminate at a common level.

7. A process for elevating pebbles comprising feeding pebbles to an annulus surrounding an upright lifting zone and gravitating said pebbles thru said annulus and inwardly toward a zone axially below the lower end of said lifting zone; passing a primary lifting gas downwardly through a second annulus intermediate said lifting zone and first said annulus to the lower end of said lifting zone and thence upwardly thru same; initiating flow of pebbles into said primary lift gas by directing an upward axial stream of secondary lift gas against the pebbles directly below the lower end of said lifting zone; as a faster rate of lifting is desired, directing a plurality of annular streams of secondary lift gas from annuli surrounding first said stream of secondary lift gas upwardly against the pebbles below said lifting zone so as to lift additional pebbles into said stream of primary lift gas; regulating the rate of flow of primary and secondary lift gas so as to elevate said pebbles to a desired level; and effecting separation of pebbles from said lift gas adjacent the upper end of said lifting zone.

8. The process of claim 7 wherein secondary lift gas is directed upwardly against the pebbles below said lifting zone from a plurality of annulose zones surrounding said axial stream of secondary lift gas successively from the adjacent to the most remote of said annulose zones.

References Cited in the file of this patent

UNITED STATES PATENTS

| | | |
|---|---|---|
| 1,364,532 | Von Porat | Jan. 4, 1921 |
| 1,390,974 | Von Porat | Sept. 13, 1921 |
| 2,561,409 | Ardern | July 24, 1951 |
| 2,561,771 | Ardern | July 24, 1951 |
| 2,587,669 | Weinrich | Mar. 4, 1952 |
| 2,587,670 | Weinrich | Mar. 4, 1952 |
| 2,662,796 | Shabaker | Dec. 15, 1953 |
| 2,699,363 | Weinrich | Jan. 11, 1955 |

FOREIGN PATENTS

| | | |
|---|---|---|
| 7,075 | Netherlands | Mar. 18, 1922 |